Patented May 4, 1937

2,079,580

UNITED STATES PATENT OFFICE 2,079,580

PROCESS FOR THE RECOVERY OF MONO-METHYL AMINE

Lloyd C. Swallen, Terre Haute, Ind., assignor to Commercial Solvents Corporation, Terre Haute, Ind., a corporation of Maryland No Drawing. Application August 29, 1932, Serial No. 630,797

6 Claims. (Cl. 202—51)

This invention relates to a method for the recovery of mono-methyl amine from mixtures of methyl amines. More specifically, this invention relates to a process for the recovery of mono-methyl amine from mixtures of mono-, di- and tri-methyl amines obtained in the catalytic synthesis from methanol and ammonia.

The methyl amines may be prepared from formaldehyde and ammonium chloride, from methyl cyanate, by the reduction of hydrocyanic acid, by the action of ammonia on methyl iodide, methyl chloride or methyl nitrate, etc. However, they may best be made on a commercial scale by the catalytic synthesis from methanol and ammonia as disclosed in co-pending applications, Serial Numbers 468,992 and 468,993, filed July 18, 1930 by Lloyd C. Swallen and Jerome Martin. In this method methanol vapor and ammonia are passed over catalytic oxide dehydrating catalysts or over aluminium silicate at temperatures from 300–500° C. The mixture leaving the catalyst is found to comprise mono-, di- and tri-methyl amines, ammonia, any unconverted methanol, the water which is formed in the reaction and any decomposition products of the methanol or ammonia such as hydrogen and carbon monoxide.

The recovery of mono-methyl amine from mixtures of amines obtained by any of the above reactions or from the mixtures resulting from the catalytic synthesis containing methanol, ammonia, water, etc., in addition to the amines, has presented a problem which has not been satisfactorily solved until the present time. Expensive and complicated methods involving formation of salts and fractional crystallization or selective solution have been employed. These methods, however, are obviously disadvantageous from the standpoint of commercial production.

It has now been discovered that the methyl amines or mixtures of methyl amines and ammonia possess properties which make possible a satisfactory and economical separation of the mono-methyl amine from the di- and tri-methyl amines by fractional distillation under superatmospheric pressure. This invention is applicable to mixtures of methyl amines obtained from any source, but is particularly applicable to the mixtures obtained in the catalytic synthesis. In the latter case it is preferable that the water, unreacted methanol, ammonia and uncondensable gases be removed before the separation of the mono-methyl amine. If only a small amount of ammonia is present, however, the separation can be effected directly by the method of this invention, whereby the mono-ethyl amine and ammonia are separated from the di- and tri-methyl amines. If this procedure is followed, the ammonia may subsequently be separated from the mono-methyl amine by known methods such as those disclosed in co-pending applications, Serial Numbers 486,059 and 486,060 by Lloyd C. Swallen and 476,794 by Lloyd C. Swallen and B. Clark Boeckeler.

If the amines are obtained from reactions other than the catalytic synthesis they will usually be in the form of salts such as the hydrochlorides, and ammonia may or may not be present in these mixtures according to the reaction by which they were prepared. In any case, such mixtures must be treated to free the amines before the present invention is applicable. A convenient method for this procedure is to free the amines in a pressure kettle by the addition of a non-volatile base, distil them from the resulting aqueous solution and collect them in the liquid form in a pressure receiver.

This invention may best be illustrated by the following specific examples:

Example I

A substantially anhydrous mixture of liquid mono-, di- and tri-methyl amines free from ammonia and methanol is charged into a steam heated pressure kettle equipped with a 30 plate fractionating column. The condenser is so arranged that the condensate can be divided as desired into product and reflux to the head of the column. Heat is supplied to the kettle, the pressure is maintained at about 60 pounds per square inch and a total reflux in the column is maintained until the temperature at the top of the column indicates that the material in the topmost plates is substantially pure mono-methyl amine. At 60 pounds per square inch this temperature will be approximately 36° C. The condensate at this point is split and a portion is run to the mono-methyl amine receiver, maintaining a reflux ratio of about 5 to 1. The temperature at the top of the column is watched continually and if it is found to rise the reflux ratio is increased, by cutting down the rate of flow of the product. When the temperature in the center of the column has reached 12–15° C. above the boiling point of the mono-methyl amine at the operating pressure, the flow of product is shut off completely and the refluxing is continued until the temperature in the bottom of the column is about 18° above the boiling point of the mono-methyl amine and an analysis of the contents of the kettle indicates that a satisfactory separation has been attained.

Example II

A mixture of mono-, di- and tri-methyl amine hydrochlorides is charged into a steam heated pressure kettle and sufficient concentrated solution of caustic soda is added to free all of the amines. The distillation is carried out with a sufficiently high reflux ratio to allow a complete separation of the amines from the water and the product is collected in the liquid form in a pressure receiver. A small portion of the liquid amines obtained in this manner is charged into the kettle of the separating still which is equipped with a 30 plate bubble cap column. Heat is supplied to the kettle, pressure is maintained at about 60 pounds per square inch and the liquid amines are fed in at the sixteenth plate of the column at such a rate as to maintain equilibrium and a constant distillation of pure mono-methyl amine with a reflux ratio of about 5 to 1. When the kettle has been filled with di- and tri-methyl amines (containing only a small percentage of mono-) the feed is shut off and the distillation is continued as described in Example I until the separation is complete.

Example III

The mixture leaving the catalyst chamber in the catalytic synthesis of methyl amines from methanol and ammonia is first cooled in order to remove the unconverted methanol, the water formed in the reaction and any condensation products or other products of side reactions which may be removed at this point by condensation. The uncondensed gases are then compressed to a pressure of about 50 pounds and then cooled again to remove the remainder of the substances which condense at temperatures above the condensation point of mono-methyl amine or ammonia at that pressure. The mixture is then compressed in the second stage of the compressor to a pressure of about 200 pounds and is then cooled at that pressure to condense the ammonia and methyl amines. The mixture is then sent to a storage tank where the non-condensable gases are bled off. These gases consist of hydrogen, carbon monoxide, nitrogen and other decomposition products of the materials entering the catalyst chamber. The liquid amines and ammonia are then charged into the kettle of the separating still or are fed into approximately the middle of the column of the still. The distillation is carried out at approximately 150 pounds as described in co-pending application Serial No. 476,794 and the mixture of ammonia free amines is collected in the kettle. When the distillation is complete the separation of the mono-methyl amine may be carried out in the same kettle by reducing the pressure to approximately 60 pounds per square inch and continuing the distillation as described in Example I above; or the liquid amines may be charged into the middle of the column of a second separating still and the distillation carried out as outlined in Example II above.

In carrying out the separation according to the processes in any of the examples described above the amine content of the distillate is found to comprise about 97% mono-methyl amine and the residue in the kettle to comprise the higher amines with a mono-methyl amine content of less than 1 mol. per cent. However, by increasing the efficiency of the column, increasing the reflux ratio, etc., a separation approaching the theoretical even closer than these values may be obtained.

In certain cases, especially in the separation of amines from the catalytic process, there may be present dimethyl ether in amounts such that it is not all removed with the ammonia. In such cases, the ether will be found in the mono-methyl amine distillate in the present process, and may be separated from it by any of the known processes.

It is to be understood, of course, that this invention is not to be limited to the use of the particular equipment described above nor to the particular operating conditions. For example, a packed column may be used in place of the bubble cap plate type and a dephlegmator may be employed in series with the condenser instead of by-passing a part of the total condensate back to the column. While 60 pounds per square inch pressure was specified in the examples, pressures of from 50 to 65 pounds have been found to be eminently suited for this process and pressures of from 40 to 80 pounds are satisfactory. These values, however, are not to be considered as limiting. The lower limit of pressure will depend upon the available cooling means for the condensers; the higher limit upon the cost of equipment and the maintenance cost for a high pressure operation. It is to be further understood that the invention is applicable to other mixtures of amines than those described above. For example, mixtures of mono-methyl and di-methyl amines or mixtures of mono-methyl and tri-methyl amines may be separated by this process.

Likewise, the procedure employed is not to be understood as limited to the specific examples set forth above. For instance, when a continuous feed is employed, as in Example II, the process may be operated in a continuous manner instead of in the semi-continuous manner of the example by continuously removing the di- and tri-methyl amines from the kettle. In general, it may be said that any modifications or changes which would naturally occur to one skilled in the art may be employed without departing from the spirit of this invention.

The invention now having been described, what is claimed is:

1. In a process for recovering mono-methyl amine from mixtures of substantially pure methyl amines, the steps which comprise liquefying the methyl amines, and fractionally distilling under pressures of from 40 to 80 pounds per square inch to separate the mono-methyl amine from the remaining amines.

2. In a process for recovering mono-methyl amine from mixtures of substantially pure methyl amines, the steps which comprise liquefying the methyl amines and fractionally distilling under a pressure of about 60 pounds per square inch to separate the mono-methyl amine from the remaining amines.

3. In a process for recovering mono-methyl amine from mixtures obtained in the catalytic synthesis of methyl amines from methanol and ammonia, the steps which comprise removing by condensation the products which are liquid at atmospheric temperatures and pressures, liquefying the methyl amines and ammonia, removing non-condensable gases, separating the ammonia from the methyl amines and fractionally distilling the methyl amines under pressures of from 40 to 80 pounds per square inch to separate the mono-methyl amine from the remaining amines.

4. In a process for recovering mono-methyl amine from mixtures obtained in the catalytic synthesis of methyl amines from methanol and ammonia, the steps which comprise removing by condensation the products which are liquid at atmospheric temperatures and pressures, liquefying the methyl amines and ammonia, removing non-condensable gases, separating the ammonia from the methyl amines and fractionally distilling the methyl amines under a pressure of about 60 pounds per square inch to separate the mono-methyl amine from the remaining amines.

5. In a process for recovering mono-methyl amine from mixtures of substantially pure methyl amines, the steps which comprise liquefying the methyl amines, and fractionally distilling under a pressure in excess of 40 lbs. per square inch to separate the mono-methyl amine from the remaining amines.

6. In a process for recovering mono-methyl amine from mixtures obtained in the catalytic synthesis of methyl amines from methanol and ammonia, the steps which comprise removing by condensation, the products which are liquefied at atmospheric temperatures, liquefying the methyl amines and ammonia, removing non-condensable gases, separating the ammonia from the methyl amines, and fractionally distilling the methyl amines under a pressure in excess of 40 lbs. per square inch to separate the mono-methyl amine from the remaining amines.

LLOYD C. SWALLEN.